(12) United States Patent
Kolding et al.

(10) Patent No.: US 10,015,747 B2
(45) Date of Patent: Jul. 3, 2018

(54) METHOD AND APPARATUS FOR PROVIDING EFFICIENT DISCONTINUOUS COMMUNICATION

(71) Applicant: Nokia Technologies Oy, Espoo (FI)

(72) Inventors: Troels Kolding, Klarup (DK); Lars Dalsgaard, Oulu (FI); Frank Frederiksen, Klarup (DK); Jarkko T. Koskela, Oulu (FI); Mika P. Rinne, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/882,582

(22) Filed: Jan. 29, 2018

(65) Prior Publication Data

US 2018/0152892 A1  May 31, 2018

Related U.S. Application Data

(62) Division of application No. 12/027,061, filed on Feb. 6, 2008, now Pat. No. 9,918,277.

(Continued)

(51) Int. Cl.
*H04W 52/02* (2009.01)
*H04W 72/12* (2009.01)

(52) U.S. Cl.
CPC ........ *H04W 52/0235* (2013.01); *H04W 72/12* (2013.01); *Y02D 70/00* (2018.01); *Y02D 70/1224* (2018.01); *Y02D 70/1226* (2018.01); *Y02D 70/1262* (2018.01); *Y02D 70/146* (2018.01); *Y02D 70/23* (2018.01); *Y02D 70/24* (2018.01); *Y02D 70/25* (2018.01); *Y02D 70/26* (2018.01)

(58) Field of Classification Search
CPC ........ Y02D 70/00; Y02D 70/23–70/26; Y02D 70/146; Y02D 70/1224; Y02D 70/1226; Y02D 70/1262
See application file for complete search history.

(56) References Cited

U.S. PATENT DOCUMENTS 7,369,518 B2   5/2008  Lee
2002/0053075 A1  5/2002  Paz et al.
(Continued)

FOREIGN PATENT DOCUMENTS

CN   1520100 A   8/2004
JP   3162798 A   6/1997
(Continued)

OTHER PUBLICATIONS

Office Action for corresponding European Patent Application No. 08 709 775.4-1216, dated Feb. 7, 2018, 4 pages.
(Continued)

*Primary Examiner* — Raymond Dean
(74) *Attorney, Agent, or Firm* — Ditthavong & Steiner, P.C.

(57) ABSTRACT

An approach is provided for receiving and transmitting data over a wireless network, while minimizing power consumption. A determination is made, as part of a discontinuous communication mechanism defining an on-period for permitting transmission of data over a network, whether a resource allocation has been made to a user equipment for communicating over the network. If the resource allocation has been made, generating a keep-awake message to instruct the user equipment to extend the on-period.

20 Claims, 17 Drawing Sheets

Related U.S. Application Data

(60) Provisional application No. 60/888,514, filed on Feb. 6, 2007.

(56) References Cited

U.S. PATENT DOCUMENTS

| | | |
|---|---|---|
| 2002/0082910 A1 | 6/2002 | Kontogouris |
| 2004/0105401 A1 | 6/2004 | Lee |
| 2006/0094441 A1 | 5/2006 | Beckmann et al. |
| 2008/0084845 A1 | 4/2008 | Kuchibhotla et al. |

FOREIGN PATENT DOCUMENTS

| | | |
|---|---|---|
| WO | 2006114710 A2 | 11/2006 |
| WO | 2008057296 A | 5/2008 |
| WO | 2008114977 A1 | 9/2008 |

OTHER PUBLICATIONS

Chinese Office Action for related Chinese Patent Application No. 20078003952.6 dated Dec. 5, 2012, 10 Pages.

Chinese Office Action for related Chinese Patent Application No. 200880008630.6 dated Apr. 12, 2016, with English-language Summary, 9 Pages.

Chinese Office Action for related Chinese Patent Application No. 200880008630.6 dated Jul. 1, 2013, 9 Pages.

Chinese Office Action for related Chinese Patent Application No. 200880008630.6 dated Mar. 1, 2012, 11 Pages.

International Search Report and Written Opinion for related International Patent Application No. PCT/IB2008/000267 dated Dec. 4, 2008, pp. 1-15.

Japanese Office Action for related Japanese Patent Application No. 2009-548761 dated Aug. 14, 2012, 7 Pages.

Japanese Office Action for related Japanese Patent Application No. 2009-548761 dated Dec. 20, 2011, 10 Pages.

Japanese Office Action for related Japanese Patent Application No. 2009-548761 dated Feb. 11, 2013, with English-language Summary, 5 Pages.

Korean Office action for related Korean Patent Application No. 10-2009-7018546 dated Apr. 12, 2011, 8 Pages.

LG Electronics, "DRX Scheme", 3GPP TSG-RAN WG2 Meeting #56, 3rd Generation Partnership Project (3GPP) Technical specification Group (TSG)-Radio Access Network (RAN) Working Group 2 (WG2), Nov. 6-10, 2006, retrieved on Dec. 14, 2017 from http://www.3gpp.org/DynaReport/TDocExMtg--R2-56-25413.htm, 4 Pages.

NTT Docomo, Inc., "Views on DRX/DTX Control in LTE", 3GPP TSG-RAN WG2 Meeting #56, 3rd Generation Partnership Project (3GPP) Technical specification Group (TSG)-Radio Access Network (RAN) Working Group 2 (WG2), Nov. 6-10, 2006, retrieved on Dec. 14, 2017 from http://www.3gpp.org/DynaReport/TDocExMtg--R2-56--25413.htm, 3 Pages.

Rejection Decision for related Japanese Patent Application No. 200880008630.6 dated Jan. 26, 2014, with English-language Summary, 9 Pages.

METHOD AND APPARATUS FOR PROVIDING EFFICIENT DISCONTINUOUS COMMUNICATION

RELATED APPLICATIONS

This application is a divisional of U.S. patent application Ser. No. 12/027,061, filed on Feb. 6, 2008, entitled "Method and Apparatus for Providing Efficient Discontinuous Communication", which claims priority from U.S. Provisional Application Ser. No. 60/888,514, filed on Feb. 6, 2007, entitled "Method and Apparatus for Providing Efficient Discontinuous Communication," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves optimizing transmission of data in a manner that accounts for conservation of power of the terminal and end user performance through the use of discontinuous transmission and reception.

SOME EXEMPLARY EMBODIMENTS

Therefore, there is a need for an approach for receiving and transmitting data over a wireless network, while minimizing power consumption.

According to one embodiment of the invention, a method comprises determining, as part of a discontinuous communication mechanism defining an on-period for permitting transmission of data over a network, whether a resource allocation has been made to a user equipment for communicating over the network. The method also comprises generating, if the resource allocation has been made, a keep-awake message to instruct the user equipment to extend the on-period.

According to another embodiment of the invention, an apparatus comprises a discontinuous communication module configured to perform a discontinuous communication procedure that defines an on-period for permitting transmission of data over a network, and to determine whether a resource allocation has been made to a user equipment for communicating over the network. The discontinuous communication module is further configured to generate, if the resource allocation has been made, a keep-awake message to instruct the user equipment to extend the on-period.

According to another embodiment of the invention, a method comprises receiving a keep-awake message indicating extension of an on-period of a discontinuous communication procedure over a network. The keep-awake message was generated in response to determining that a resource allocation has been made.

According to yet another embodiment of the invention, an apparatus comprises a discontinuous communication module configured to receive a keep-awake message indicating extension of an on-period of a discontinuous communication mechanism over a network. The keep-awake message was generated in response to determining that a resource allocation has been made.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing a wake-up mechanism and an efficient transmission scheme are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
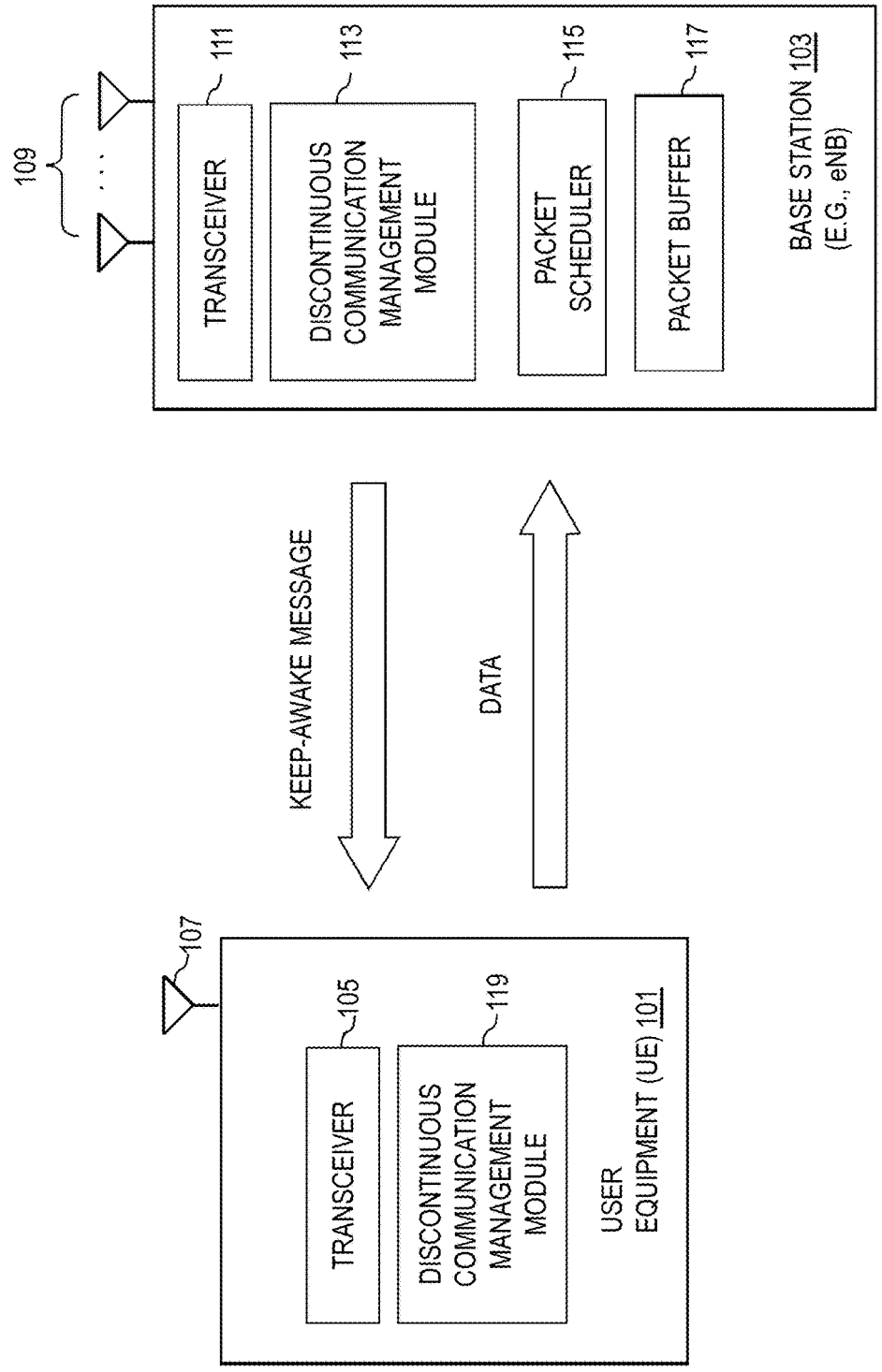
FIG. 1 is a diagram of a communication system capable of providing a power saving for a user equipment (UE) through the use of discontinuous communication mechanism, according to an exemplary embodiment of the invention.

FIG. 1 is a diagram of a communication system capable of providing a power saving for a user equipment (UE) through the use of discontinuous communication mechanism, according to an exemplary embodiment of the invention. By way of example, the communication system is compliant with 3GPP LTE, entitled "Long Term Evolution of the 3GPP Radio Technology" (which is incorporated herein by reference in its entirety). As shown in FIG. 1, one or more user equipment (UEs) 101 communicate with a network equipment, such as a base station 103, which is part of an access network (e.g., WiMAX (Worldwide Interoperability for Microwave Access), 3GPP LTE (or E-UTRAN or 3.9G), etc.). Under the 3GPP LTE architecture (as shown in FIGS. 13A-13D), base station 103 is denoted as an enhanced Node B (eNB). The UE 101 can be any type of mobile stations, such as handsets, terminals, stations, units, devices, or any type of interface to the user (such as "wearable" circuitry, etc.). The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands. The UE 101 includes a transceiver 105 and an antenna system 107 that couples to the transceiver 105 to receive or transmit signals from the base station 103. The antenna system 107 can include one or more antennas (of which only one is shown). Accordingly, the base station 103 can employ one or more antennas 109 for transmitting and receiving electromagnetic signals. As with the UE 101, the base station 103 employs a transceiver 111, which transmits information over a downlink (DL) to the UE 101.

In one embodiment, the system 100, as an LTE network, is a packet-only system, in which real wireless packet based connections are provided. Because the LTE system 100 is a packet-based system, there is no so-called "dedicated" connection (as known from 2G and 3G) reserved for communication between the UE 101 and the network (i.e., the base station 103). In an exemplary embodiment, resources needed for data transfer in the LTE architecture are assigned either as one time assignments or in a more persistent/semi-static way.

Thus, over time there can be large variations in the traffic scheduled to a certain user. From a multi-user diversity perspective, it may be so that a UE (which can be an enhanced UE (eUE)) is seldomly scheduled (e.g., every 20 ms in average for instance), but with a very high instantaneous data rate (since the eUE is scheduled when the UEs radio conditions are excellent). From the eUE perspective, it is important that if such scheduling patterns can be predicted, the "off-periods" can be utilized to initiate entry into an inactive or "sleep" state, thereby saving battery consumption. The agreement of "on" and "off/DRX" periods needs be clear between the eNB 103 and the eUE 101, and is assumed to be signaled through a higher layer robust (e.g. acknowledged with hand-shake) signaling channel (e.g., RRC (Radio Resource Control) signaling is the default mechanism in LTE).

As shown, the base station 103 includes a discontinuous communication (e.g., reception/transmission (RX/TX)) management module 113 for managing active and inactive states of reception and transmission by the base station 103. Thus, this discontinuous RX/TX mechanism, as mentioned above, conserves battery consumption during non-transmission or non-reception periods. The management module 113 interacts with a packet scheduler 115 to coordinate exchange of data between the base station 103 and the UE 101; the data to be transmitted to the UE 101 can be stored in a packet buffer 117.

The UE 101 similarly utilizes a discontinuous communication management module 119 to remain in an active state ("awake") or enter an inactive state ("sleep") based on signaling from the base station 103. This signaling is more fully described below.

Figure 2:
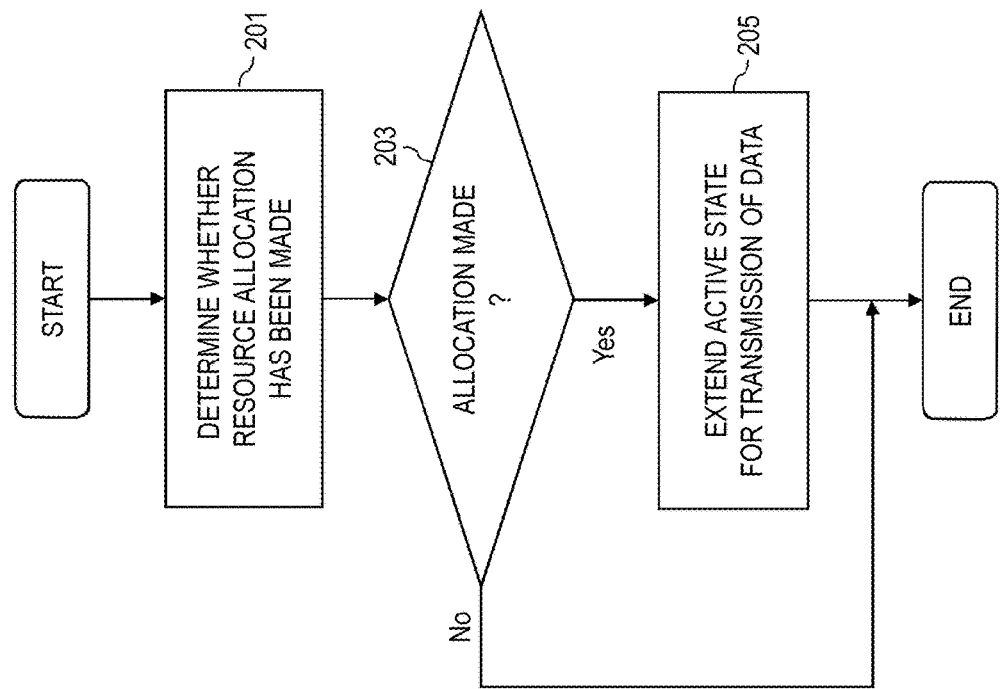
FIG. 2 is a flowchart of a discontinuous communication process involving extension of an active state, in accordance with an embodiment of the invention.

FIG. 2 is a flowchart of a discontinuous communication process involving extension of an active state, in accordance with an embodiment of the invention. This process introduces a "keep-awake" mechanism into a discontinuous RX/TX procedure. In step 201, the process determines whether a resource allocation has been made. If so (per step 203), the active state or on-period for communication (e.g., reception or transmission) is extended, as in step 205. To better appreciate the above approach, it is instructive to examine a conventional discontinuous RX/TX procedure, as explained in FIG. 3.

Figure 3:
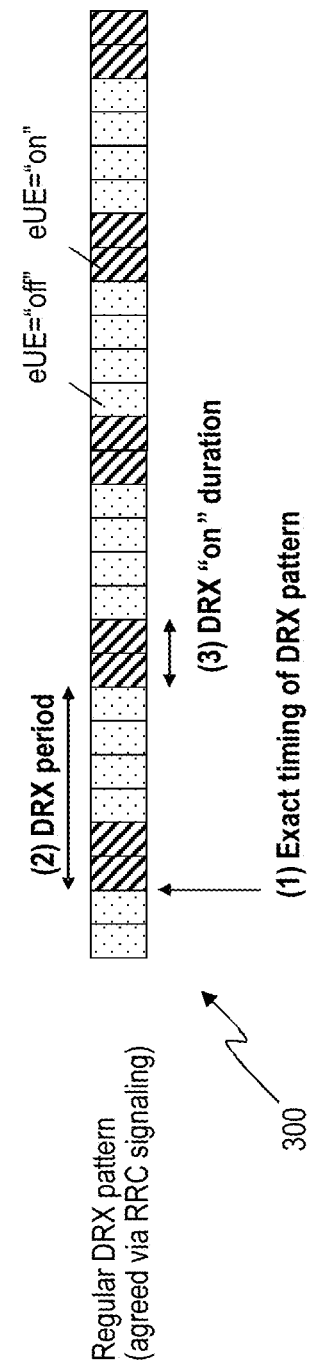
FIG. 3 is a diagram of an exemplary discontinuous reception (DRX) mechanism utilizing configuration parameters.

FIG. 3 is a diagram of an exemplary discontinuous reception (DRX) mechanism utilizing configuration parameters. The "regular DRX" mechanism is characterized by three parameters: (1) the exact "phase/timing" of the starting point of the first "on" period, (2) the DRX period denoting the "time distance" between consecutive "on" periods, and (3) the duration of each on-period, as depicted in DRX pattern 300. To achieve substantial eUE power saving, the DRX period should be as long as possible. However, as the DRX period also defines the "responsiveness" of the system 100 (e.g., length of time from when the UE clicks on a web-link until the web-page starts downloading), a compromise is needed between the level of power savings and responsiveness.

For such services as VoIP (Voice over IP), the traffic pattern can be predictable. Hence, it is possible to configure the regular DRX concept effectively. However, for other services, this is not the case; and both the download-amount as well as the inter-download waiting time may vary widely. One example is web-browsing, in which the user displays an unpredictable reading behavior, and whereby the web-sites vary greatly in complexity and size. The eNB buffer pattern for a typical web-browsing user is illustrated in FIG. 4.

Figure 4:
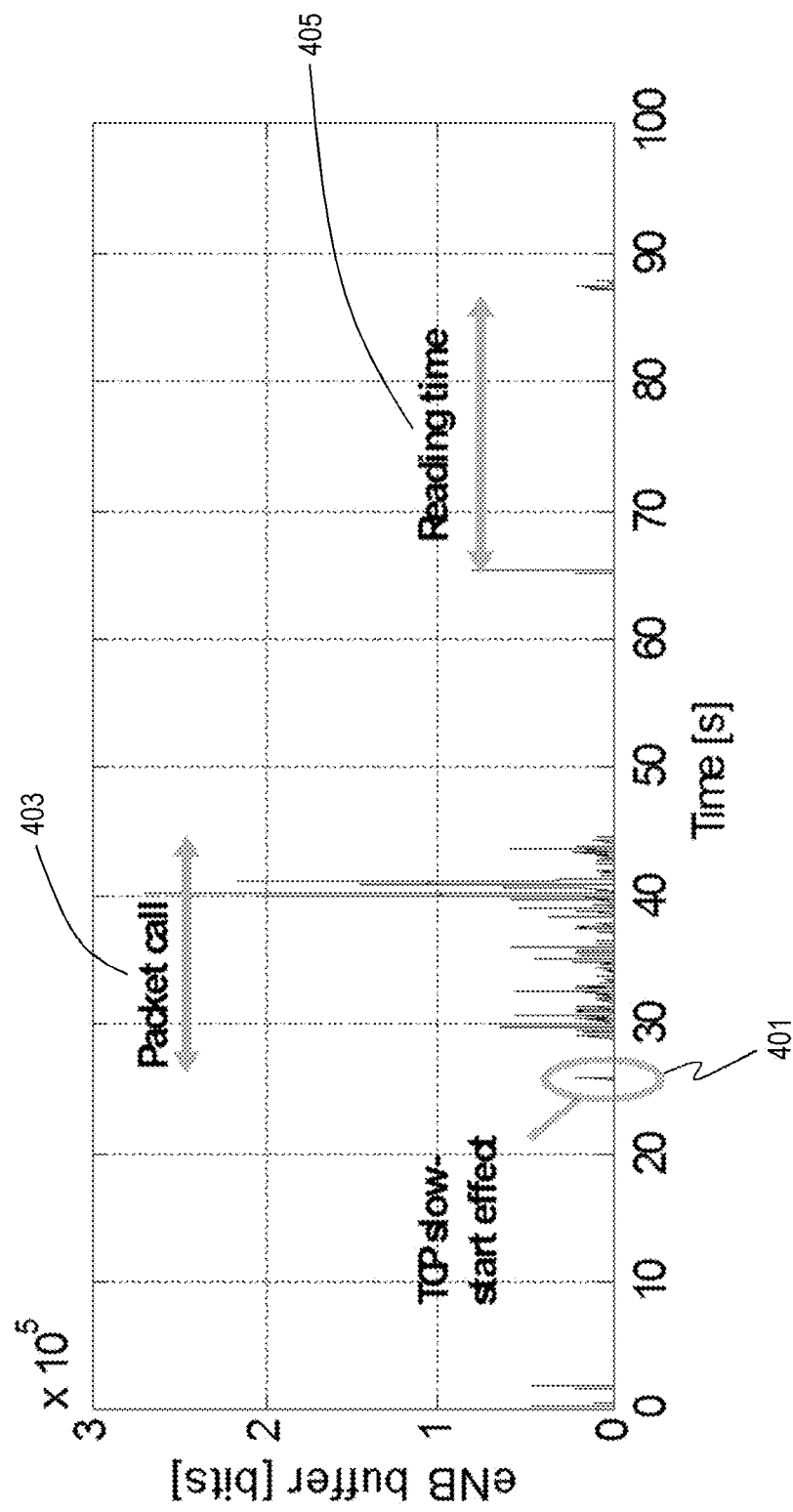
FIG. 4 is a diagram showing traffic pattern for an exemplary web browsing session including the effect of Transmission Control Protocol (TCP) slow start, in accordance with an embodiment of the invention.

FIG. 4 is a diagram showing traffic pattern for an exemplary web browsing session including the effect of Transmission Control Protocol (TCP) slow start, in accordance with an embodiment of the invention. In this example, the TCP slow start effect occurs at point 401; this TCP behavior essentially increases the TCP congestion window exponentially based on receipt of acknowledgements, and then proceeds to a linear growth phase. The buffer 117 of the eNB 103 then begins to fill at point 403. Subsequent to the packet call, point 405 shows the reading time.

Returning to scenario of FIG. 3, it is recognized that because the DRX period needs to be configured for a worst-case scenario (e.g., large web-site and shortest reading times), this may deprive the UE 101 from attaining significant power saving. One approach is to allow the eNB 103 and eUE 101 to semi-statically update the DRX parameters via RRC according to the traffic conditions. This is a relatively slow process (e.g. ~20 ms round-trip time between DRX message and RRC ACK is received). In addition, it is observed that RRC messages have significant overhead (which should be minimized). This issue can be addressed by employing an approach that provides a fast L1 (or similar) configuration in order to adapt the current DRX period to the buffer information and other system input. In certain embodiments, this approach calls for dedicated L1 signaling, where there are some relatively high error rates and possibilities for misunderstandings between eUE 101 and eNB 103 (e.g., HARQ (Hybrid Automatic Repeat reQuest)) ACK to NACK errors and opposite if DRX control is sent via normal L1 mechanisms). Further, if the fast L1 DRX control signaling is sent outside the normal control channel, the error probability for the control channel will increase due to the loss of error detection as well as loss of H-ARQ gain.

Figure 5:
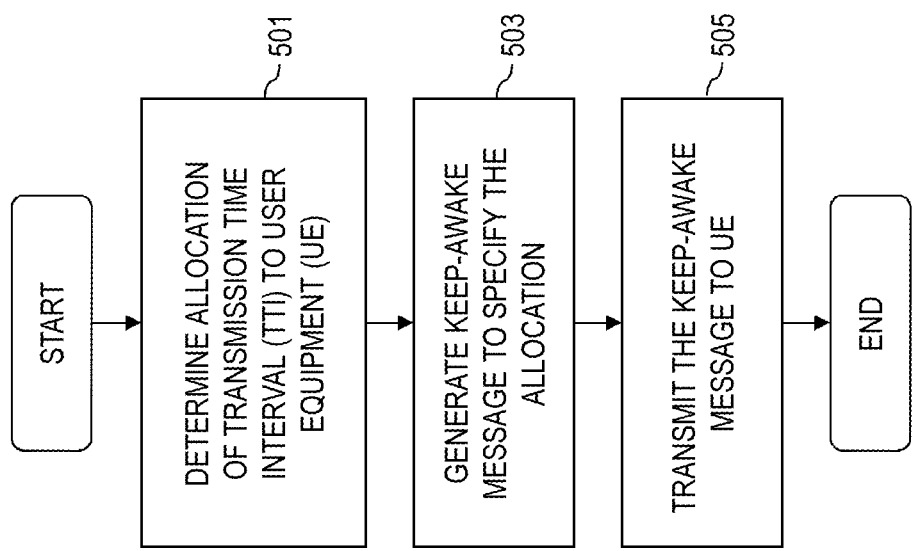
FIG. 5 is a flowchart of a process for providing power saving using a "keep awake" message, in accordance with an embodiment of the invention.

FIG. 5 is a flowchart of a process for providing power saving using a keep-awake message, in accordance with an embodiment of the invention. A "keep-awake" mechanism, according to one embodiment, provides an extension to the regular DRX concept. This mechanism defines, for both the eUE 101 and the eNB 103, when the UE 101 should extend its "on"-time (or "on-period") to receive more data.

In step 501, the process determines that the eNB 103 schedules an allocation (e.g., transmission time interval (TTI)) to the UE 101. Next, the eNB 103 generates a keep-awake message to specify the allocation, as in step 503. In step 505, the eNB 103 proceeds to transmit the keep-awake message to the UE 101.

According to certain embodiments, two signalling approaches are utilized to instruct the UE 101 to remain in an active state (as described in FIGS. 7 and 8): (1) no overhead; and (2) minimal overhead. In the first approach (i.e., zero-overhead approach), the "keep-awake" message is identical or maps directly to "if or if not" conditions relating to whether the UE 101 has been scheduled. Under the second approach, this flexible 1-bit overhead approach (which is predefined) allows the system to increase the UE power saving for the same end-user performance.

Figure 6:
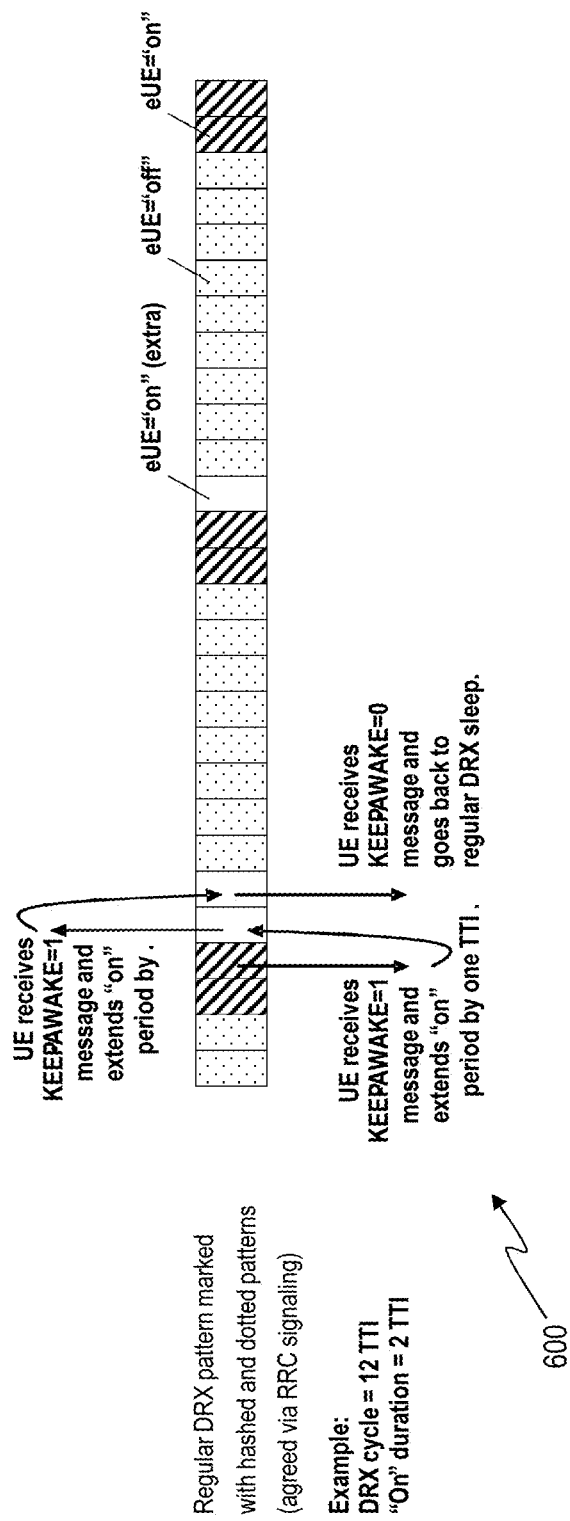
FIG. 6 is a diagram of a "keep awake" mechanism associated with a discontinuous reception process, in accordance with an embodiment of the invention.

In an exemplary embodiment, a "keep-awake" message is illustrated in FIG. 6.

FIG. 6 is a diagram of a "keep awake" mechanism associated with a discontinuous reception process, in accordance with an embodiment of the invention. With the DRX pattern 600, the baseline "on" periods as defined by the regular DRX are shown in hashed and dotted blocks (e.g., on-duration is 2 Transmission Time Intervals (TTIs)). One rule between the eNB 103 and the eUE 101 for determining the on/off state for a current TTI is as follows (i.e., pseudo-code seen from UE perspective):

TABLE 1

IF TTI-1 was the last TTI of the "on" time
   IF KEEP-AWAKE=1 (received during TTI-1)
      UE also is "on" during TTI (e.g. receives allocation table etc.)
   ELSEIF KEEP-AWAKE=0 (received during TTI-1)
      UE goes back to normal regular DRX behavior; i.e., allowed to sleep
   END
ELSEIF TTI-1 was an additional on period (defined by KEEP_AWAKE in TTI-1)
   IF KEEP-AWAKE=1 (received during TTI-1)
      UE also is "on" during TTI (e.g. receives allocation table etc.)
   ELSEIF KEEP-AWAKE=0 (received during TTI-1)
      UE goes back to normal regular DRX behavior
   END
ELSE
   Use normal regular DRX to define behavior
END By way of example, the KEEP-AWAKE message can extend an on-period by 1 TTI at a time. In the following two modes for KEEP-AWAKE definition are described. The KEEP-AWAKE message can include a parameter KEEP-AWAKE (1, number of TTIs). This would allow avoiding repetition of the KEEP-AWAKE message in every TTI.

According to one embodiment of the invention, this "additional DRX" feature can be enabled or disabled in each cell—e.g., for all users in the cell or on a per-user basis via RRC.

Figure 7:
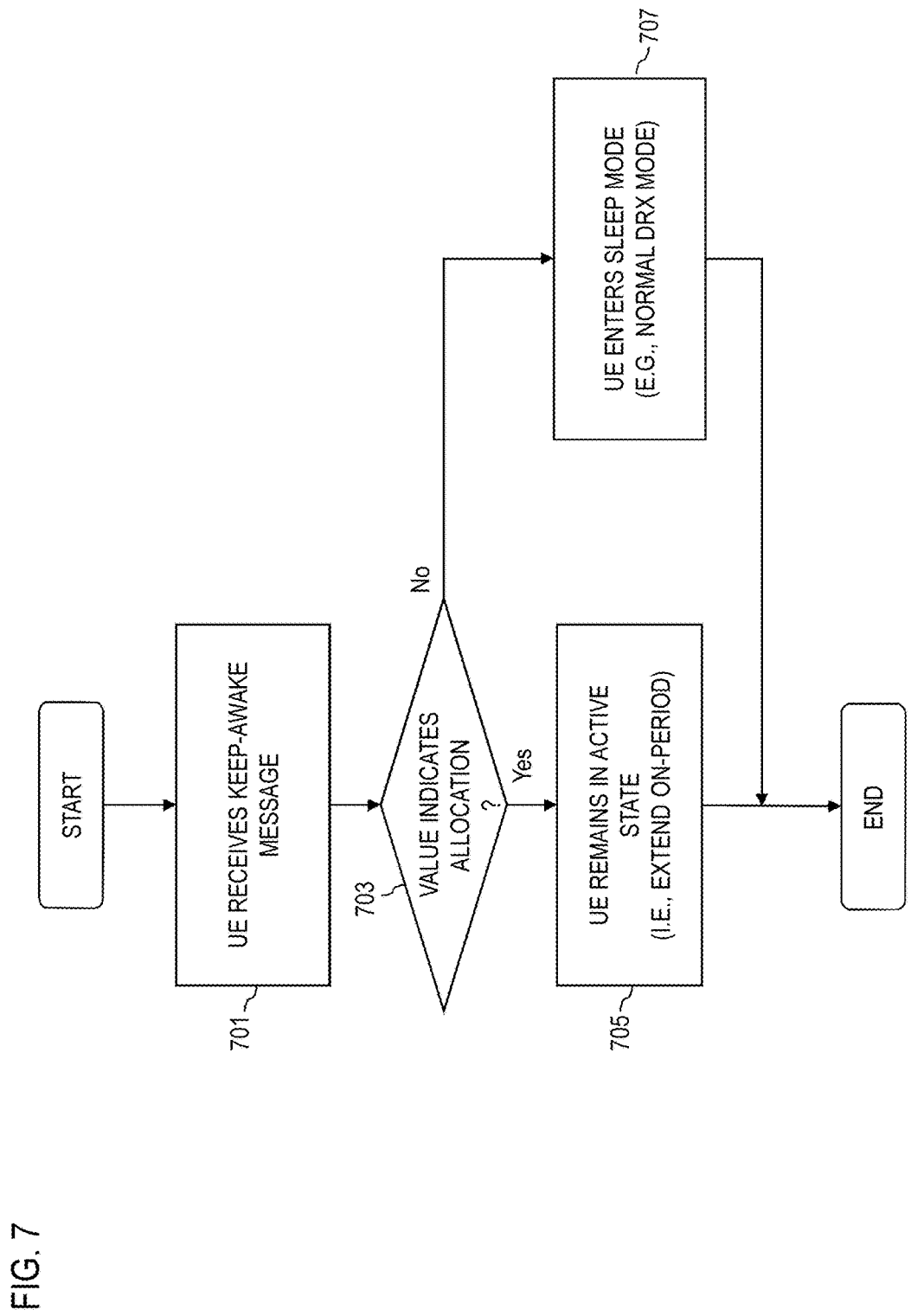
FIG. 7 is a flowchart of process for extending the on-period for a user equipment without overhead, in accordance with an embodiment of the invention.

FIG. 7 is a flowchart of process for extending the on-period for a user equipment without overhead, in accordance with an embodiment of the invention. This zero-overhead extended DRX approach provides that the KEEP-AWAKE message is identical to an allocation table decision, as shown in Table 2:

TABLE 2

| KEEP-AWAKE(TTI) | DESCRIPTION |
| --- | --- |
| KEEP-AWAKE(TTI) = 1 | UE is allocated in TTI (appears in allocation table) |
| KEEP-AWAKE(TTI) = 0 | UE is not allocated in TTI (appears in allocation table) |

For example, the UE 101 remains awake until it is no longer scheduled in the uplink/downlink. The eNB packet scheduler 115 can then keep the UE 101 awake and empty the buffer 117 during each DRX period if desired. When combined with the concept of "regular DRX on-duration longer than one," this still provides ample scheduling freedom for the eNB 103. In an exemplary embodiment, if eNB 103 seeks to keep UE 101 awake longer than on-duration, the eNB 103 schedules the UE 101 during the last TTI in the on-duration. As the priority is not likely to change significantly over a single TTI, this is not problematic.

In step 701, the UE 101 receives a KEEP-AWAKE message, which in this example indicates an allocation has been made. In step 703, the UE 101 examines the value of the KEEP-AWAKE message. If the value indicates an allocation, then the UE 101 remains in an active state (step 705). Otherwise, the UE 101 can enter a sleep mode, per step 707, as in the normal DRX mode.

It is noted that in the above approach, the UE 101 can fail in the detection of its entry in the allocation table. Because this is relevant to the reception of any data, the percentage of error can be controlled, for example, to 1% or less. Consequently, the "cost" is that the eNB 103 may waste some time scheduling for the successive TTI(s) for a "def" UE that has already gone to sleep. This is believed to be a minor issue compared to the potential benefits. Those uncertainties can be taken into account when conducting the packet scheduling of successive TTIs. Also, a warning mechanism can be implemented such that when the eNB 103 detects a missed reception from the UE 101 (DTX received instead of ACK/NACK (acknowledgement/negative acknowledgement), whereby the higher layer protocols can take proper action.

A concern arises when the eNB 103 exactly empties the buffer 117 towards a UE 101 in the last "on" TTI during the regular DRX. Under this scenario, the UE 101 stays awake and does not receive any scheduling priority. Further, if the UE 101 processes very regular traffic (e.g., VoIP) and only needs on-duration=1TTI for each DRX period, the UE 101 may stay awake for an additional TTI always since it is always scheduled. For such cases, this keep-awake mode can be enabled/disabled on a per user basis (or at least on a per cell basis), in accordance with one embodiment.

Figure 8:
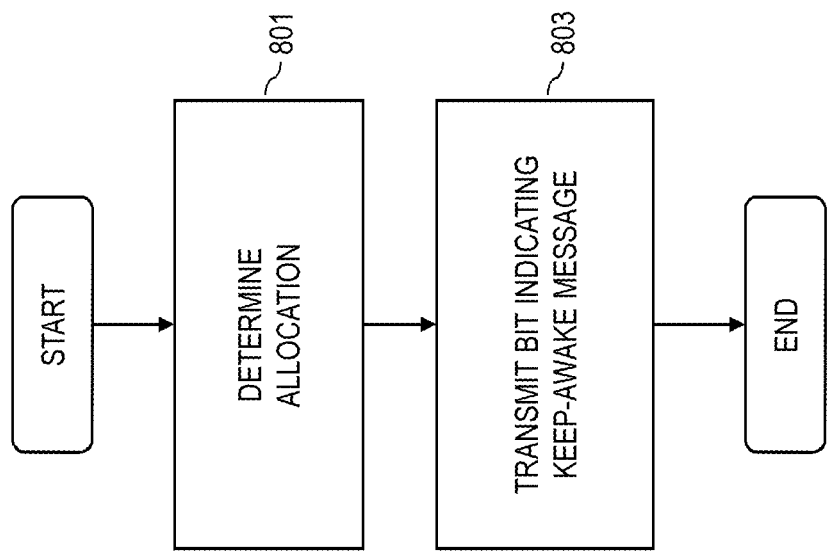
FIG. 8 is a flowchart of process for extending the on-period for a user equipment with minimal overhead, in accordance with an embodiment of the invention.

FIG. 8 is a flowchart of process for extending the on-period for a user equipment with minimal overhead, in accordance with an embodiment of the invention. Under this exemplary embodiment, a direct bit indicating the KEEP-AWAKE message is sent over a dedicated control channel, upon detecting that a resource allocation has been granted (steps 801 and 803). This approach addresses directly the issues mentioned in the zero-overhead solution and also allows for a non-configured DRX extended mode; e.g., the active mode can always be on.

To accommodate the KEEP-AWAKE message, the following issues are considered. If the UE 101 is scheduled in, for instance, the downlink in the last TTI (Transmission Time Interval) in an on-period, the bit can be transmitted as part of the payload, according to one embodiment. Since it is predefined when the KEEP-AWAKE message is sent, the normal rate matching operation can work on both eNB and UE side to "make room" for the additional bit. In this case, the error probability of receiving the KEEP-AWAKE message would correspond to the error rate of the normal packet if encoded together.

If UE 101 is not scheduled in downlink in last TTI in an on-period, a dedicated downlink control channel must be available for sending the KEEP-AWAKE bit.

Use of the bit minimizes the probability that the UE 101 will stay awake without data being received, thereby improving the power consumption of the UE 101.

Figure 9:
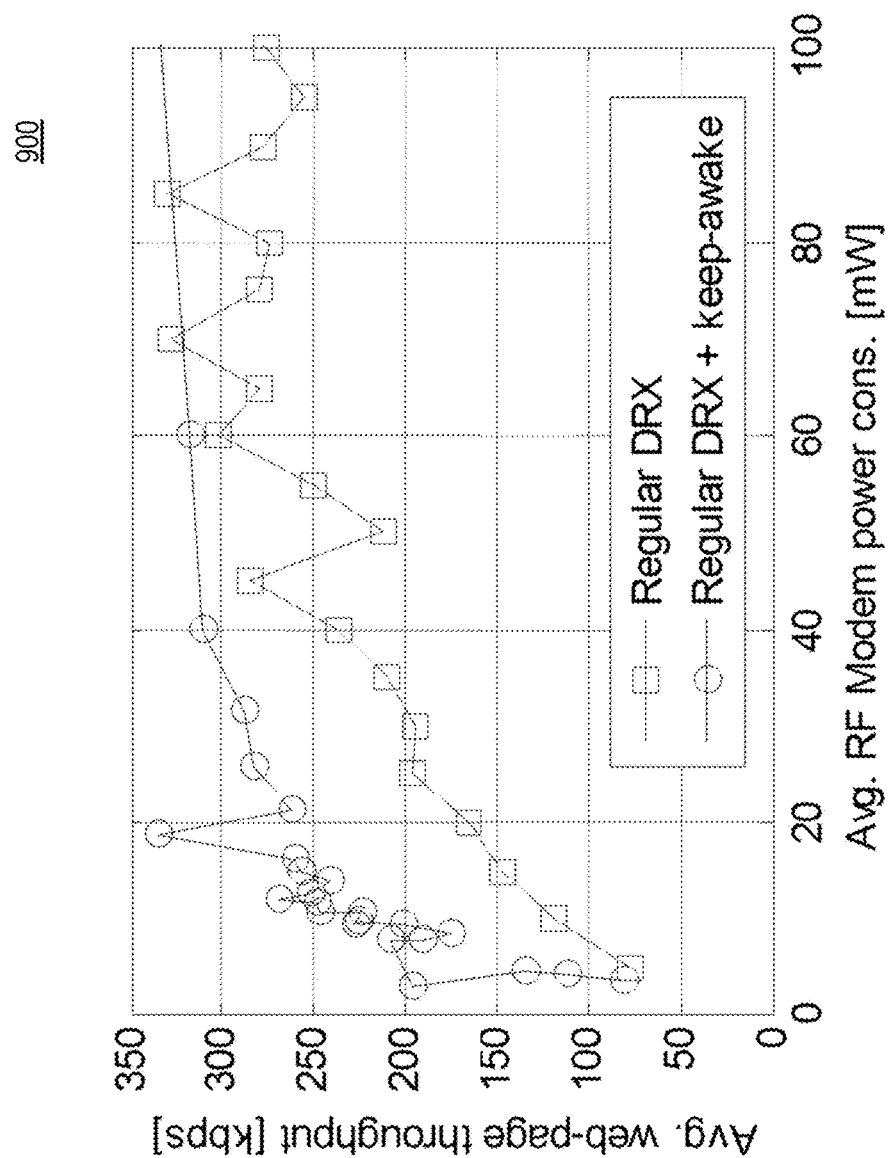
FIG. 9 is a graph of a performance comparison relating to the keep-awake mechanism, in accordance with an embodiment of the invention.

FIG. 9 is a graph of a performance comparison relating to the keep-awake mechanism, in accordance with an embodiment of the invention. In this simulation (as plotted in graph 900), the following assumptions were made: (1) a single-user is scheduled per TTI; and (2) the user is running a 2-hour web-session (e.g., 3GPP HTTP (HyperText Transfer Protocol) traffic model). Also, it is assumed that the UE 101 has a G-factor of 0 dB, and the system bandwidth is 2.5 MHz. Further, a detailed RF modem power consumption model is used that takes into account synchronization, automatic gain control (AGC), etc. By conducting 2-dimensional (2D) optimization, a comparison of the performance of optimally set regular DRX concept (e.g., setting DRX period, phase, and on-duration freely) to the described keep-awake approach (the regular DRX period, on-duration=1 TTI, is optimized). The metric for performance, for example, relates to how much average per-web-page throughput the UE experiences during the 2 hour session compared to how much RF model power is consumed. For the simulations, the zero-overhead option is used as reference. In this case, the packet scheduler 115 always prioritizes the particular DRX user when the user has data buffered for transmission. Also, no allocation table read errors are simulated (e.g., UE 101 always receives the allocation table correctly).

It is clear from these initial simulations that there is significant power saving potential for the traffic/scheduling case under study.

To improve the scheduling flexibility, the keep-awake mechanism can be modified as follows. If the UE 101 is scheduled within the on-duration (can be predefined location as above or more freely defined), the UE 101 automatically stays awake for another on-duration, thereby enhancing the scheduling flexibility for the eNB 103. Depending on the setting for the on-duration, this may cause some degradation in power consumption performance for the UE 101, however. For an on-duration equal to 1 TTI, this scenario is the same as discussed previously.

The described keep-awake approach, in certain embodiments, extends flexibility of DRX to allow for significantly better user experience per consumed RF modem power. The approach also does not require any signalling—but, is based on presence in an allocation table. Further, the keep-awake mechanism can, in one embodiment, be enabled/disabled by means of RRC signalling to improve the performance consumption for "regular DRX cases," such as VoIP.

Figure 10:
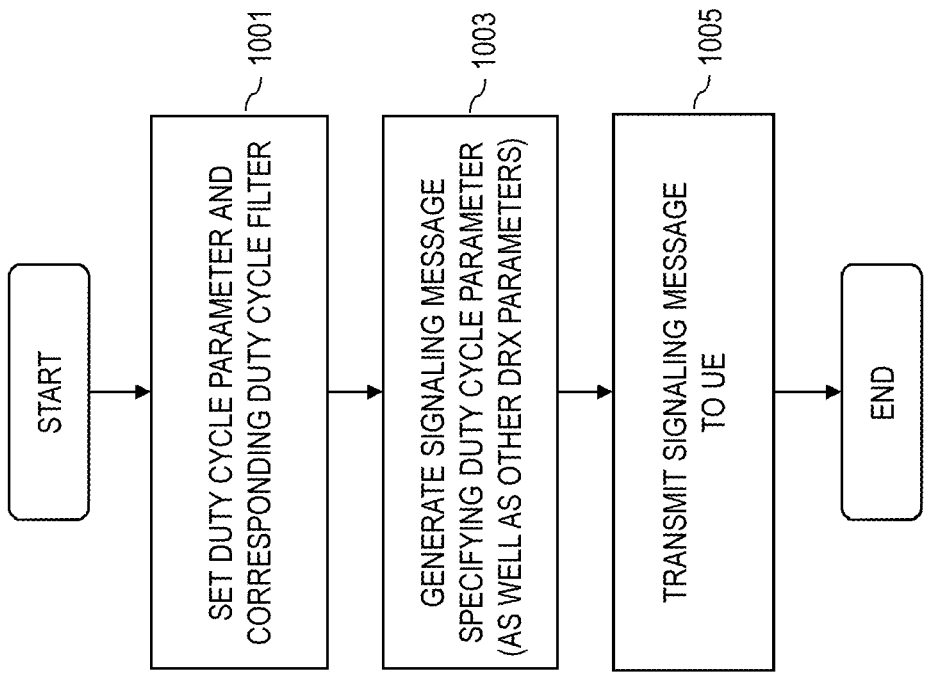
FIG. 10 is a flowchart of assigning DRX parameters including a duty cycle parameter and associated duty cycle filter parameter, in accordance with an embodiment of the invention.

Additional features of the keep-awake mechanism are now described with respect to FIG. 10.

FIG. 10 is a flowchart of assigning DRX parameters including a duty cycle parameter and associated duty cycle filter parameter, in accordance with an embodiment of the invention.

As noted, LTE working assumptions in 3GPP is that LTE_ACTIVE mode supports DRX/DTX to some level. DRX intervals can be supported in LTE_ACTIVE up to a length similar to the DRX interval used in LTE_IDLE. This ensures good UE power consumption savings in LTE_ACTIVE, while at the same time reducing the latency of "waking up," as in LTE_ACTIVE mode, most of the radio link parameters have been negotiated.

The UE 101 in LTE_ACTIVE mode is allowed to sleep when not assigned in uplink/downlink (UL/DL) resources or otherwise performing DL reception or UL transmission. Announcements about UL/DL resource allocations for a UE 101, in an exemplary embodiment, are given on downlink shared control channel (DSCCH) or Allocation Table (AT). Resource allocations for both uplink and downlink are assigned by eNB 103 in the network.

The UE 101 reads the DSCCH at every instance of DRX indicating the read-activity. In this manner, the UE 101 knows about the UL/DL resources assigned to it. The DRX procedure, in certain embodiments, is based on a two level scheme: Regular DRX controlled using RRC signaling, and Interim DRX controlled on a lower layer allowing for shorter reaction times (faster layer) e.g., MAC. Regular DRX can be based on requirements of the current connection, and determined and controlled by the network. Interim DRX can be used to handle the need for fast change in the DRX for possible increase in assignments of additional resources. The operation of interim DRX is also determined and controlled by network.

The DRX mechanism involves a UE (e.g., UE 101) receiving one DSCCH at every DRX timeout (applicable for both regular and interim DRX). The UE 101 is assigned, for example, only one regular DRX at a time which can be changed using RRC signaling.

According to certain embodiments, the following set of parameters can be used in connection with assigned DRX parameters:

TABLE 3

| Parameter | Description |
|---|---|
| Periodicity | How often will the UE wake up listening for allocations |
| Starting time (or phase) | Parameter used to distribute users having the same periodicity on different time instants |
| Duty cycle | Length of duty cycle; the UE (when awake) will listen for a number of pre-defined DSCCH (Downlink Shared Control Channel) |
| Duty cycle filter | Value specifying the duty time pattern within the duty cycle |

The eNB 103 sets the duty cycle parameter and the corresponding duty cycle filter, per step 1001, which can depend on the application/service. These parameters are then formed in a signaling message, as in step 1003. The generated signaling message is forwarded to the UE 101 (step 1005).

Figure 11:
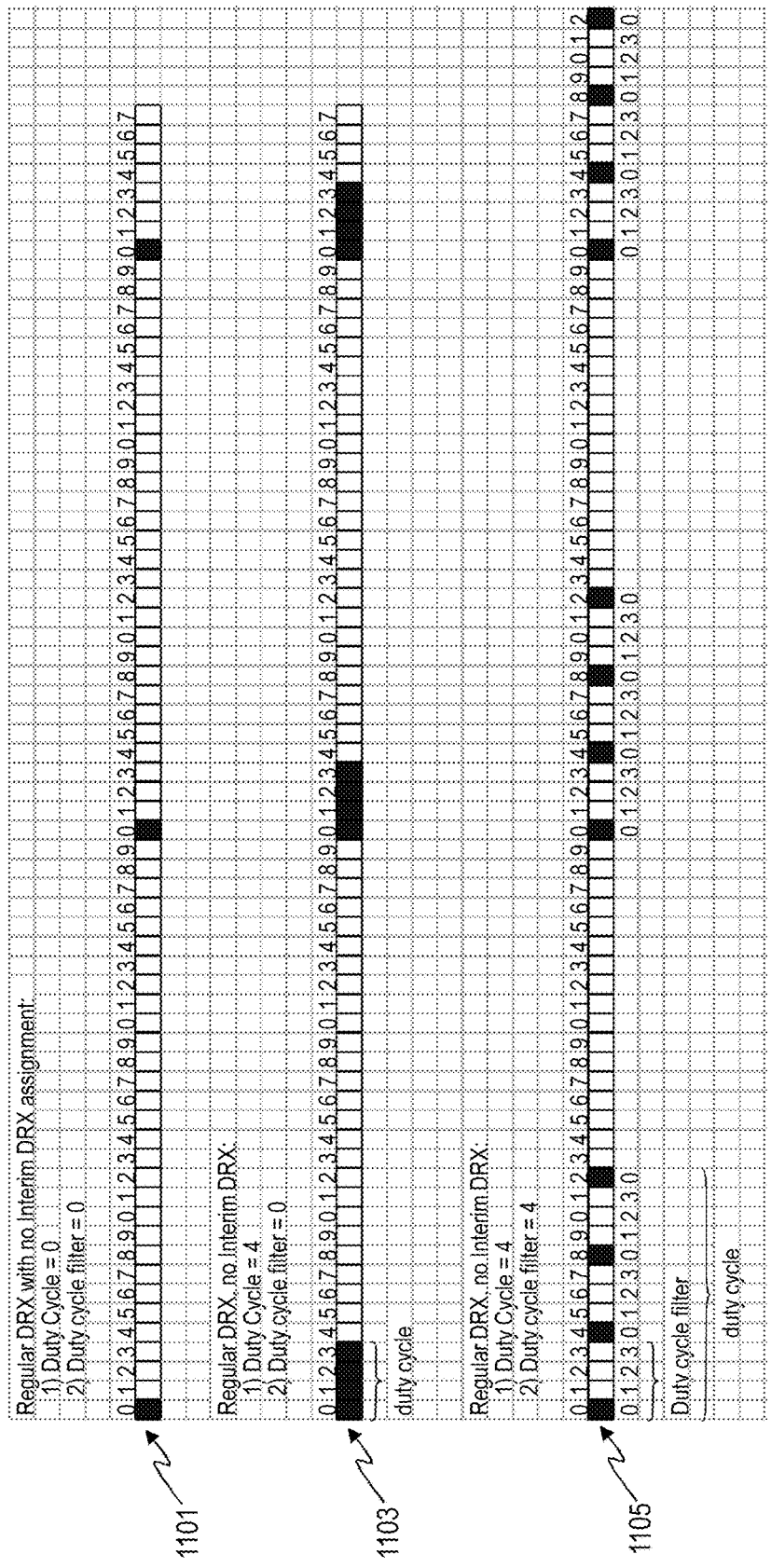
FIG. 11 is a diagram illustrating use of a duty cycle parameter, in accordance with an embodiment of the invention.

Further details of the duty cycle parameter are provided in FIG. 11.

FIG. 11 is a diagram of illustrating the duty cycle parameter, in accordance with an embodiment of the invention. By introducing the duty cycle parameter, it is ensured that the UE 101 receives more than one DSCCH per DRX timeout. As earlier described, the duty cycle controls how long the UE 101 stays awake per DRX timeout in terms of received DSCCH's. The DSCCH's received per duty cycle would be received in a continuous manner.

The duty cycle filter with DRX and duty cycle indicate whether the UE 101 is not supposed to receive the DSCCH's during the duty cycle on period in a continuous manner, but instead with another specific interval (i.e., the indicated filter). The purpose of the duty cycle filter or periodicity, according to one embodiment, is to adjust the DRX parameters to limit the amount of H-ARQ (Hybrid Automatic Repeat Request) SAW channels being active for a DRX user.

The duty cycle and duty cycle filter parameters can be assigned together with the DRX parameter(s), or they could be specified by other signaling means or by separate signaling. In one embodiment, duty cycle and duty cycle filter could be applicable for regular DRX only or applicable for both regular and interim DRX.

As mentioned, the duty cycle and duty cycle filter parameters are used in connection with given DRX parameters. The UE is assigned DRX parameters according to the requirements of the current connection. Regular DRX can be used for covering the basic traffic, while interim DRX can be assigned for handling possible needs for (sudden) increase in traffic throughput.

In one embodiment, the duty cycle and corresponding filter parameters can be determined by the network and provided to the UE—e.g., either in direct signalling together with other DRX parameters, own dedicated signalling message, or even broadcast in system information.

Some exemplary scenarios of use of both duty cycle and corresponding filter are illustrated in FIG. 11. Pattern 1101 shows a regular DRX mode with no interim DRX assignment, in which the duty cycle is 0, and the duty cycle filter is 0. Pattern 1103 has a duty cycle of 4, while pattern 1105 utilizes a duty cycle of 4 and duty cycle filter of 4.

The network signalling can be handled in various ways. With respect to the duty cycle, this value could be the amount of DSCCH allocations the UE 101 receives per DRX, according to one embodiment. This parameter can be provided as a timer indicating the time the UE 101 should 'stay awake' per DRX (UE 101 can then receive DSCCH during this time). The parameter, in one embodiment, can be specified as frames.

As for the duty cycle filter (or periodicity) parameter, this parameter specifies the interval between DSCCH receptions within the duty cycle. According to one embodiment, this parameter is provided directly as a number or in some modulus (MOD) way. The actual information can be signalled in several ways. For example, the UE 101 receives the parameters from the network and applies the parameter. As an example, the UE 101 could receive DRX parameters for regular DRX—which signalling also includes parameters for duty cycle and potentially duty cycle filter or periodicity.

One of ordinary skill in the art would recognize that the processes associated with discontinuous communication may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 12.

Figure 12:
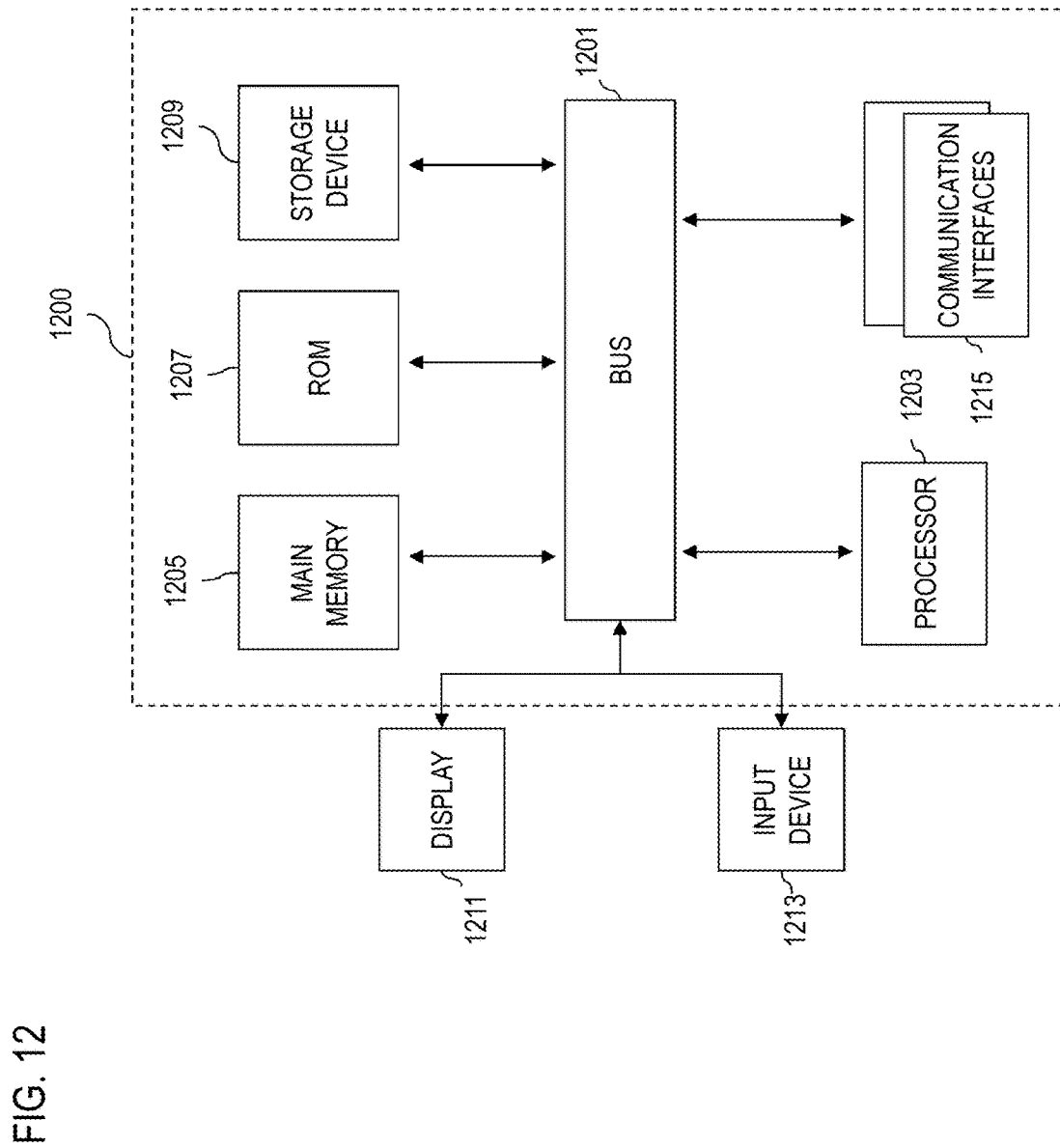
FIG. 12 is a diagram of hardware that can be used to implement an embodiment of the invention.

FIG. 12 illustrates exemplary hardware upon which various embodiments of the invention can be implemented. A computing system 1200 includes a bus 1201 or other communication mechanism for communicating information and a processor 1203 coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled via the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 13A-13D are diagrams of communication systems having exemplary long-term evolution (LTE) architectures, in which the system of FIG. 1 can operate, according to various exemplary embodiments of the invention. By way of example (shown in FIG. 13A), the base station 103 and the UE 101 can communicate in system 1300 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The MME (Mobile Management Entity)/Serving Gateways 1301 are connected to the eNBs 103 in a full or partial mesh configuration using tunneling over a packet transport network (e.g., Internet Protocol (IP) network) 1303. Exemplary functions of the MIME/Serving GW 1301 include distribution of paging messages to the eNBs 103, termination of U-plane packets for paging reasons, and switching of U-plane for support of UE mobility. Since the GWs 1301 serve as a gateway to external networks, e.g., the Internet or private networks 1303, the GWs 1301 include an Access, Authorization and Accounting system (AAA) 1305 to securely determine the identity and privileges of a user and to track each user's activities. Namely, the MME Serving Gateway 1301 is the key control-node for the LTE access-network and is responsible for idle mode UE tracking and paging procedure including retransmissions. Also, the MME 1301 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 13A:
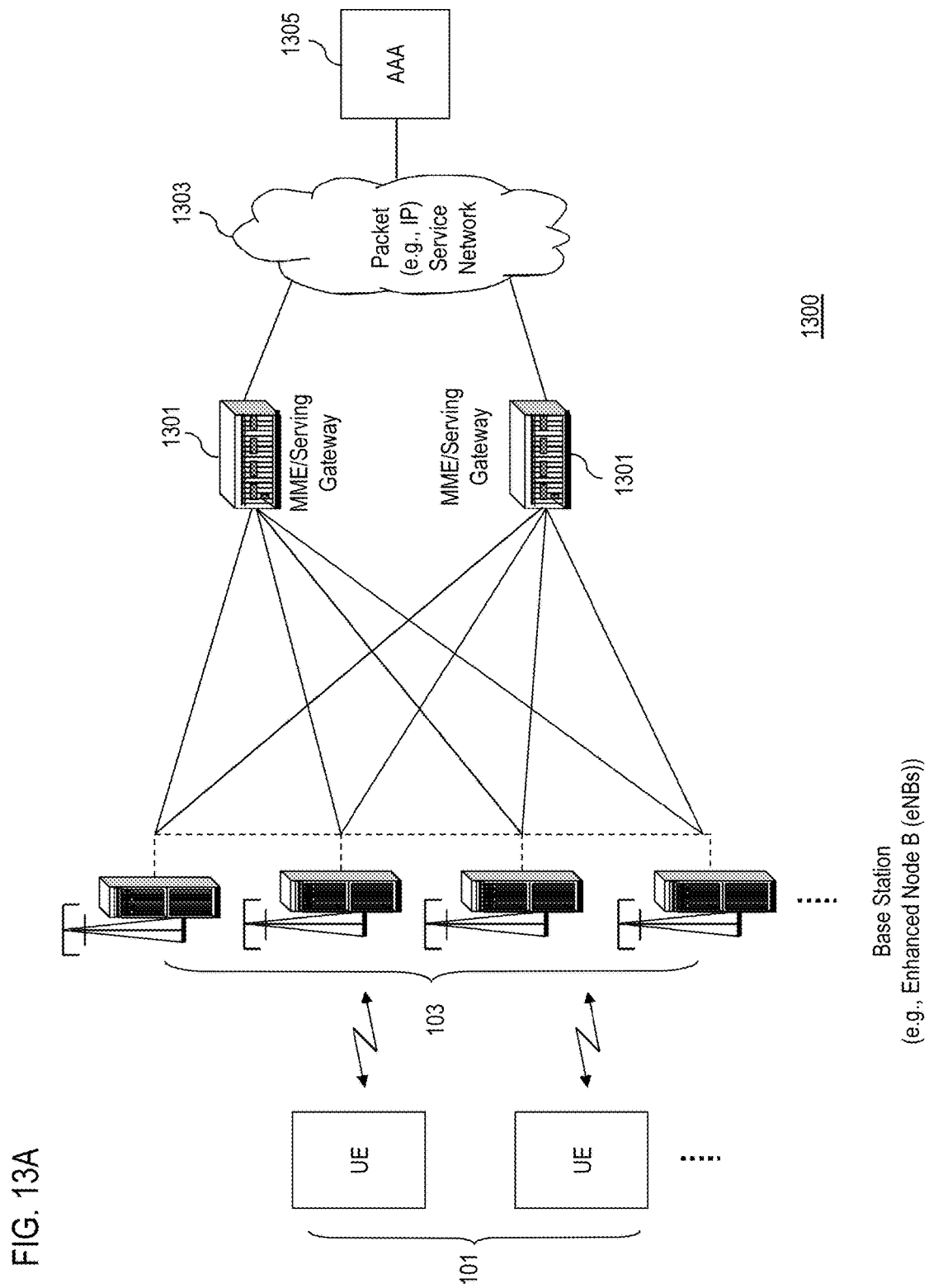
FIGS. 13A-13D are diagrams of communication systems having exemplary long-term evolution (LTE) and E-UTRA (Evolved Universal Terrestrial Radio Access) architectures, in which the system of FIG. 1 can operate, according to various exemplary embodiments of the invention.
Figure 13B:
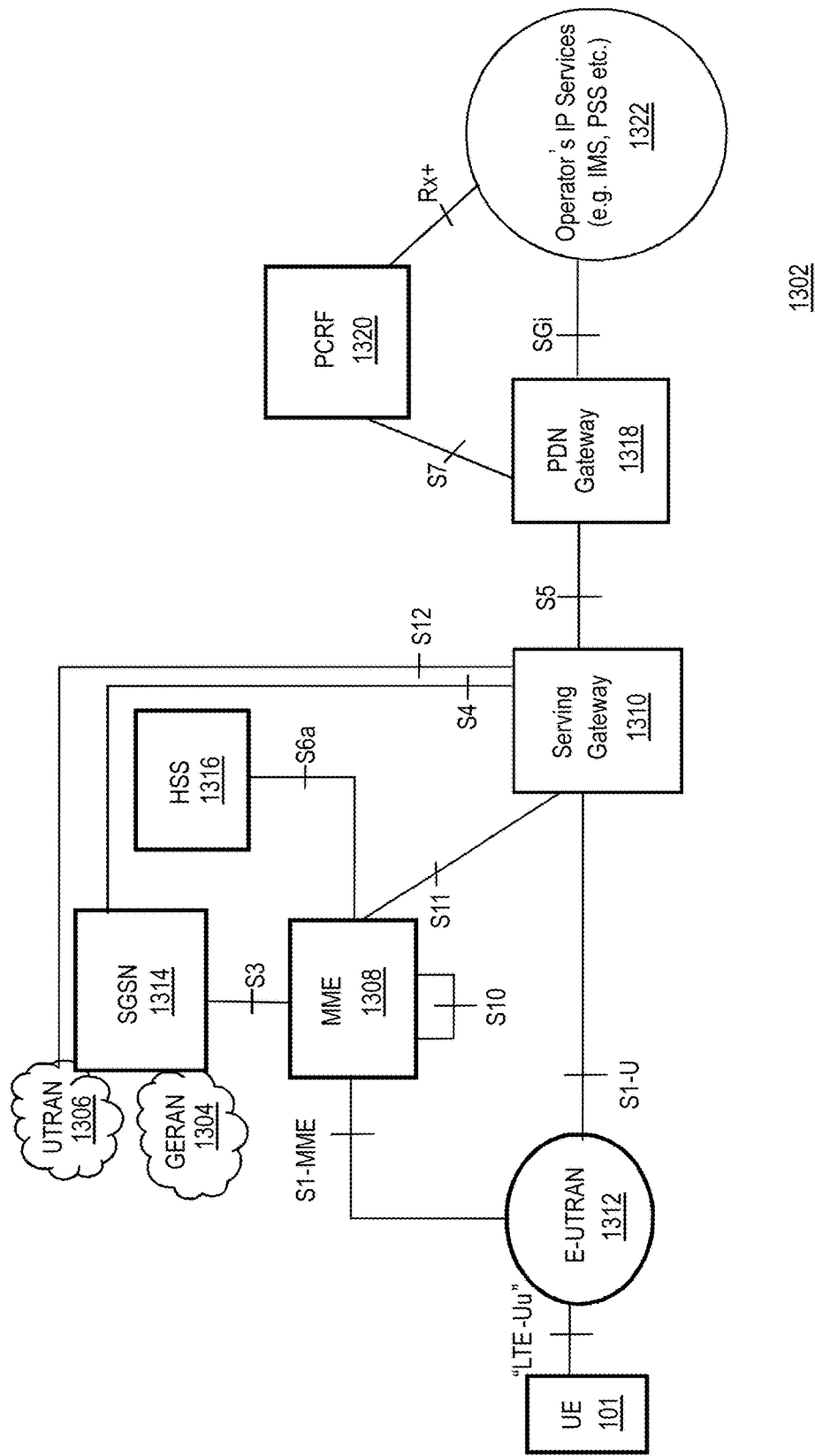

In FIG. 13B, a communication system 1302 supports GERAN (GSM/EDGE radio access) 1304, and UTRAN 1306 based access networks, E-UTRAN 1312 and non-3GPP (not shown) based access networks, and is more fully described in TR 23.882, which is incorporated herein by reference in its entirety. A key feature of this system is the separation of the network entity that performs control-plane functionality (MME 1308) from the network entity that performs bearer-plane functionality (Serving Gateway 1310) with a well defined open interface between them S11. Since E-UTRAN 1312 provides higher bandwidths to enable new services as well as to improve existing ones, separation of MME 1308 from Serving Gateway 1310 implies that Serving Gateway 1310 can be based on a platform optimized for signaling transactions. This scheme enables selection of more cost-effective platforms for, as well as independent scaling of, each of these two elements. Service providers can also select optimized topological locations of Serving Gateways 1310 within the network independent of the locations of MMES 1308 in order to reduce optimized bandwidth latencies and avoid concentrated points of failure.

The basic architecture of the system 1302 contains following network elements. As seen in FIG. 13B, the E-UTRAN (e.g., eNB) 1312 interfaces with UE 101 via LTE-Uu. The E-UTRAN 1312 supports LTE air interface and includes functions for radio resource control (RRC) functionality corresponding to the control plane MME 1308. The E-UTRAN 1312 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1308, as a key control node, is responsible for managing mobility UE identifies and security parameters and paging procedure including retransmissions. The MME 1308 is involved in the bearer activation/deactivation process and is also responsible for choosing Serving Gateway 1310 for the UE 101. MME 1308 functions include Non Access Stratum (NAS) signaling and related security. MME 1308 checks the authorization of the UE 101 to camp on the service provider's Public Land Mobile Network (PLMN) and enforces UE 101 roaming restrictions. The MME 1308 also provides the control plane function for mobility between LTE and 2G/3G access networks with the S3 interface terminating at the MME 1308 from the SGSN (Serving GPRS Support Node) 1314.

The SGSN 1314 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1308 and HSS (Home Subscriber Server) 1316. The S10 interface between MMES 1308 provides MME relocation and MME 1308 to MME 1308 information transfer. The Serving Gateway 1310 is the node that terminates the interface towards the E-UTRAN 1312 via S1-U.

The S1-U interface provides a per bearer user plane tunneling between the E-UTRAN 1312 and Serving Gateway 1310. It contains support for path switching during handover between eNBs 103. The S4 interface provides the user plane with related control and mobility support between SGSN 1314 and the 3GPP Anchor function of Serving Gateway 1310.

The S12 is an interface between UTRAN 1306 and Serving Gateway 1310. Packet Data Network (PDN) Gateway 1318 provides connectivity to the UE 101 to external packet data networks by being the point of exit and entry of traffic for the UE 101. The PDN Gateway 1318 performs policy enforcement, packet filtering for each user, charging support, lawful interception and packet screening. Another role of the PDN Gateway 1318 is to act as the anchor for mobility between 3GPP and non-3GPP technologies such as WiMax and 3GPP2 (CDMA 1× and EvDO (Evolution Data Only)).

The S7 interface provides transfer of QoS policy and charging rules from PCRF (Policy and Charging Role Function) 1320 to Policy and Charging Enforcement Function (PCEF) in the PDN Gateway 1318. The SGi interface is the interface between the PDN Gateway and the operator's IP services including packet data network 1322. Packet data network 1322 may be an operator external public or private packet data network or an intra operator packet data network, e.g., for provision of IMS (IP Multimedia Subsystem) services. Rx+ is the interface between the PCRF and the packet data network 1322.

Figure 13C:
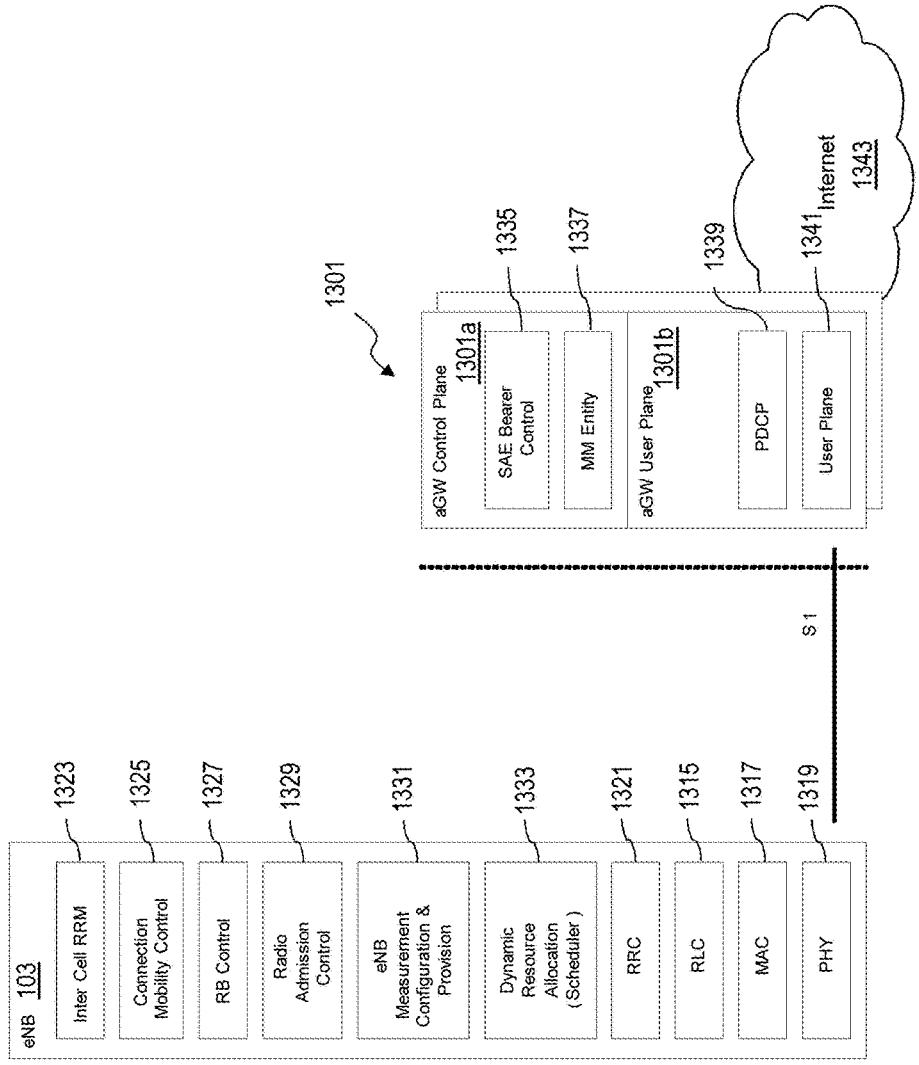

As seen in FIG. 13C, the eNB 103 utilizes an E-UTRA (Evolved Universal Terrestrial Radio Access) (user plane, e.g., RLC (Radio Link Control) 1315, MAC (Media Access Control) 1317, and PHY (Physical) 1319, as well as a control plane (e.g., RRC 1321)). The eNB 103 also includes the following functions: Inter Cell RRM (Radio Resource Management) 1323, Connection Mobility Control 1325, RB (Radio Bearer) Control 1327, Radio Admission Control 1329, eNB Measurement Configuration and Provision 1331, and Dynamic Resource Allocation (Scheduler) 1333.

The eNB 103 communicates with the aGW 1301 (Access Gateway) via an S1 interface. The aGW 1301 includes a User Plane 1301a and a Control plane 1301b. The control plane 1301b provides the following components: SAE (System Architecture Evolution) Bearer Control 1335 and MM (Mobile Management) Entity 1337. The user plane 1301b includes a PDCP (Packet Data Convergence Protocol) 1339 and a user plane functions 1341. It is noted that the functionality of the aGW 1301 can also be provided by a combination of a serving gateway (SGW) and a packet data network (PDN) GW. The aGW 1301 can also interface with a packet network, such as the Internet 1343.

Figure 13D:
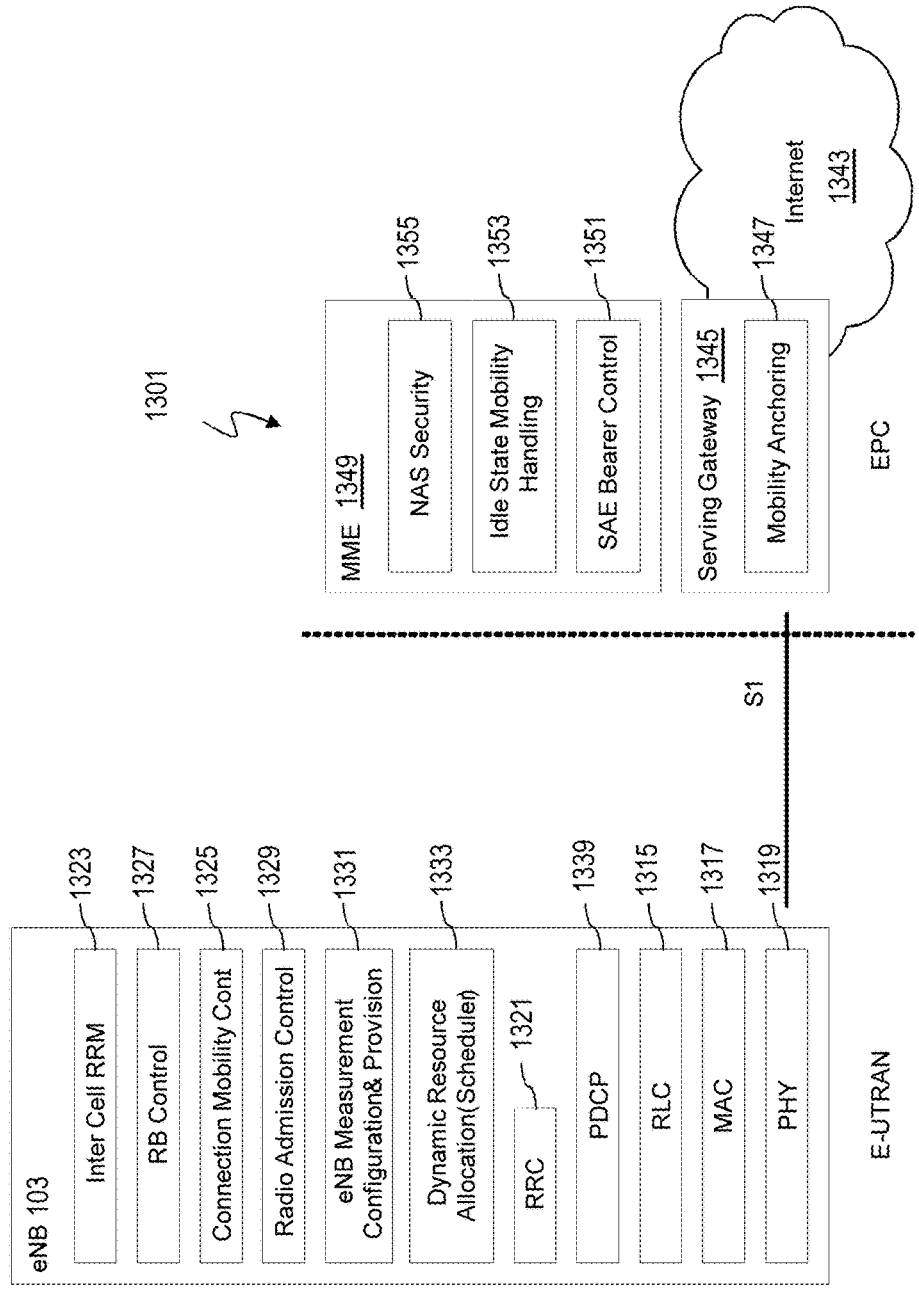

In an alternative embodiment, as shown in FIG. 13D, the PDCP (Packet Data Convergence Protocol) functionality can reside in the eNB 103 rather than the GW 1301. Other than this PDCP capability, the eNB functions of FIG. 13C are also provided in this architecture.

In the system of FIG. 13D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S1 to the Serving Gateway 1345, which includes a Mobility Anchoring function 1347. According to this architecture, the MME (Mobility Management Entity) 1349 provides SAE (System Architecture Evolution) Bearer Control 1351, Idle State Mobility Handling 1353, and NAS (Non-Access Stratum) Security 1355.

Figure 14:
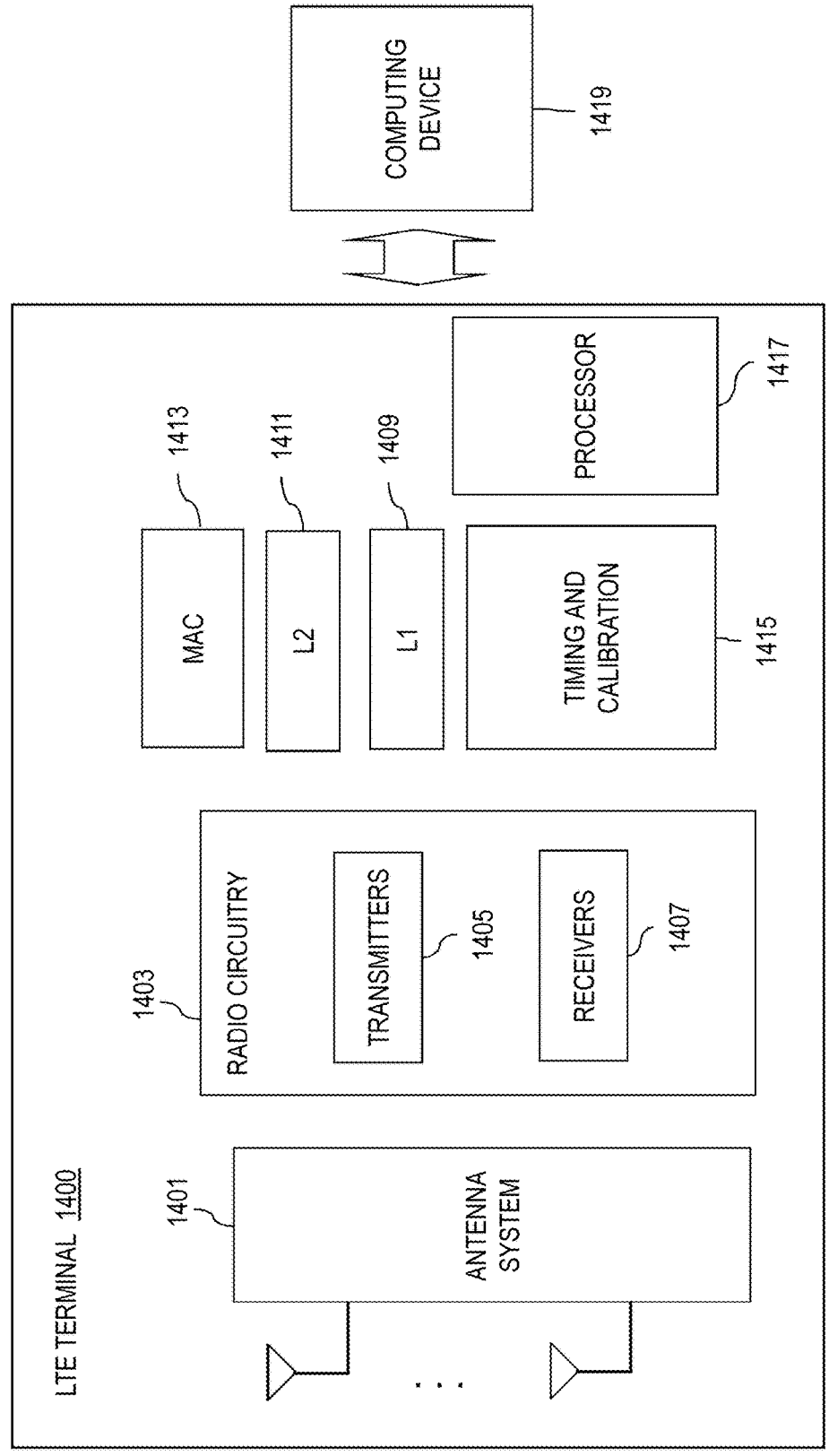
FIG. 14 is a diagram of exemplary components of an LTE terminal capable of operating in the systems of FIGS. 13A-13D, according to an embodiment of the invention.

FIG. 14 is a diagram of exemplary components of an LTE terminal capable of operating in the systems of FIGS. 13A-13D, according to an embodiment of the invention. An LTE terminal 1400 is configured to operate in a Multiple Input Multiple Output (MIMO) system. Consequently, an antenna system 1401 provides for multiple antennas to receive and transmit signals. The antenna system 1401 is coupled to radio circuitry 1403, which includes multiple transmitters 1405 and receivers 1407. The radio circuitry encompasses all of the Radio Frequency (RF) circuitry as well as base-band processing circuitry. As shown, layer-1 (L1) and layer-2 (L2) processing are provided by units 1409 and 1411, respectively. Optionally, layer-3 functions can be provided (not shown). Module 1413 executes all MAC layer functions. A timing and calibration module 1415 maintains proper timing by interfacing, for example, an external timing reference (not shown). Additionally, a processor 1417 is included. Under this scenario, the LTE terminal 1400 communicates with a computing device 1419, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, at a user equipment, a keep-awake message during an on-period of a discontinuous communication mechanism indicating extension of the on-period into at least the first transmission time interval after the end of the on-period,
wherein the keep-awake message was generated in response to determining that a resource allocation has been made.

2. A method according to claim 1, wherein the on-period is extended by one transmission time interval at a time based on value of the keep-awake message.

3. A method according to claim 1, wherein the keep-awake message corresponds to an allocation table associated with the resource allocation.

4. A method according to claim 1, wherein the keep-awake message is transmitted in form of a single bit within a dedicated control channel.

5. A method according to claim 1, wherein the network is compliant with a long term evolution (LTE) architecture.

6. A method according to claim 1, wherein the discontinuous communication procedure defines a duty cycle parameter specifying duration of the active state per timeout period, and a duty cycle filter parameter specifying a duty time pattern associated with the duty cycle parameter.

7. A method according to claim 6, wherein the discontinuous communication procedure further defines a periodicity parameter specifying frequency for listening for the resource allocations, and a starting parameter specifying start in time or phase of the active state.

8. An apparatus comprising:
a discontinuous communication module configured to receive a keep-awake message during an on-period of a discontinuous communication mechanism indicating extension of an on-period into at least the first transmission time interval after the end of the on-period,
wherein the keep-awake message was generated in response to determining that a resource allocation has been made.

9. An apparatus according to claim 8, wherein the on-period is extended by one transmission time interval at a time based on value of the keep-awake message.

10. An apparatus according to claim 8, wherein the keep-awake message corresponds to an allocation table associated with the resource allocation.

11. An apparatus according to claim 8, wherein the keep-awake message is transmitted in form of a single bit within a dedicated control channel.

12. An apparatus according to claim 8, wherein the network is compliant with a long term evolution (LTE) architecture.

13. An apparatus according to claim 8, wherein the discontinuous communication mechanism defines a duty cycle parameter specifying duration of the active state per timeout period, and a duty cycle filter parameter specifying a duty time pattern associated with the duty cycle parameter.

14. An apparatus according to claim 13, wherein the discontinuous communication mechanism further defines a periodicity parameter specifying frequency for listening for the resource allocations, and a starting parameter specifying start in time or phase of the active state.

15. An apparatus according to claim 8, wherein the apparatus is a user equipment.

16. A non-transitory computer-readable storage medium carrying one or more sequences of one or more instructions which, when executed by one or more processors, cause an apparatus to at least perform the following steps:
receiving, at a user equipment, a keep-awake message during an on-period of a discontinuous communication mechanism indicating extension of the on-period into at least the first transmission time interval after the end of the on-period,
wherein the keep-awake message was generated in response to determining that a resource allocation has been made.

17. A non-transitory computer-readable storage medium of claim 16, wherein the on-period is extended by one transmission time interval at a time based on value of the keep-awake message.

18. A non-transitory computer-readable storage medium of claim 16, wherein the keep-awake message corresponds to an allocation table associated with the resource allocation.

19. A non-transitory computer-readable storage medium of claim 16, wherein the keep-awake message is transmitted in form of a single bit within a dedicated control channel.

20. A non-transitory computer-readable storage medium of claim 16, wherein the network is compliant with a long term evolution (LTE) architecture.

* * * * *